Figure 1:
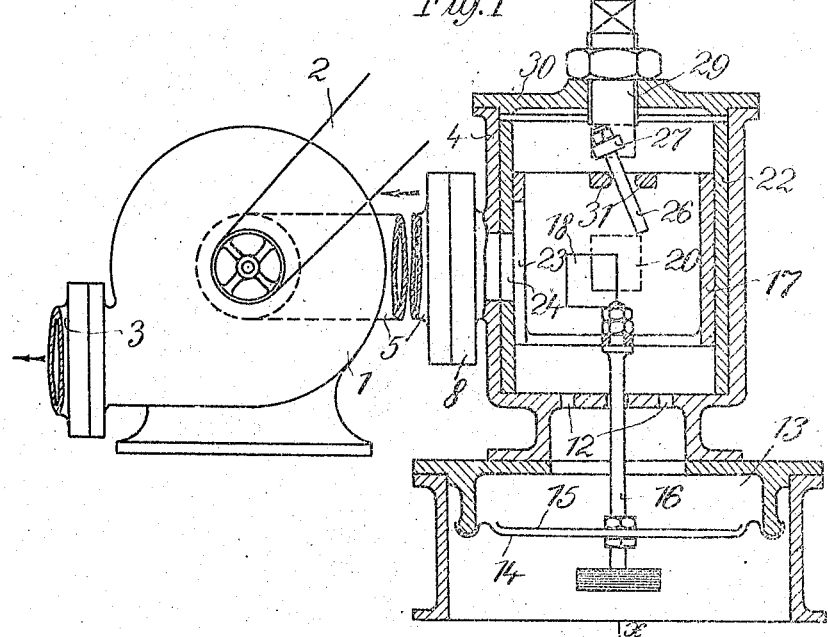

F. W. WOLFF.
MECHANISM FOR THE PRODUCTION OF A CONSTANT MIXTURE OF GAS AND AIR.
APPLICATION FILED MAR. 12, 1907.

937,016.

Patented Oct. 12, 1909.

3 SHEETS—SHEET 1.

WITNESSES:
W. M. Avery
Walton Harrison

INVENTOR
Friedrich Wilhelm Wolff
BY Munn & Co
ATTORNEYS

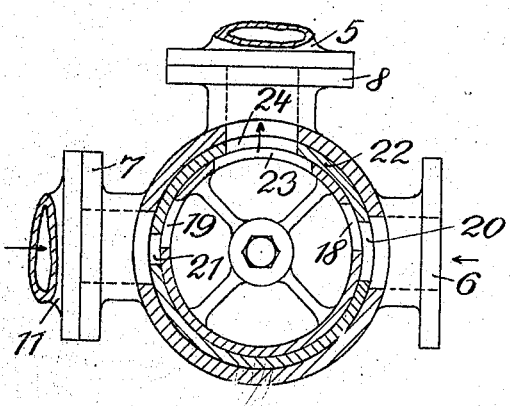
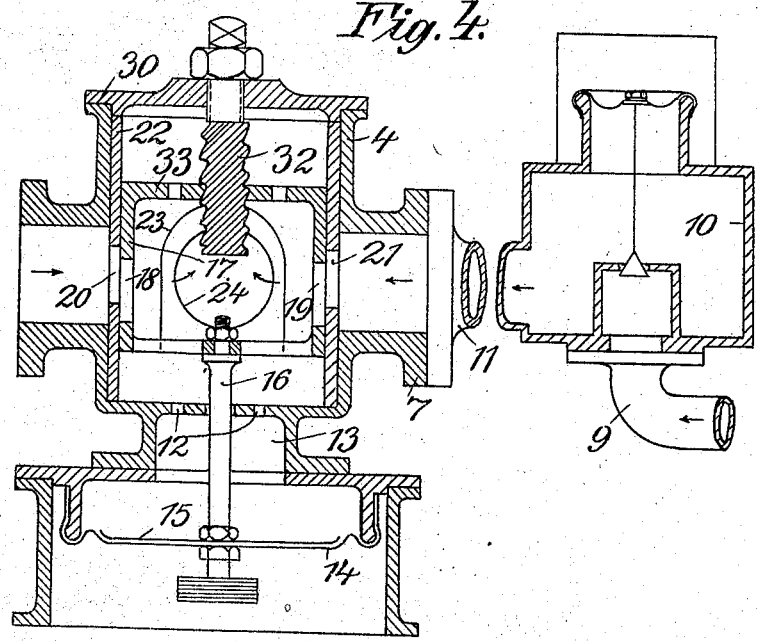

F. W. WOLFF.
MECHANISM FOR THE PRODUCTION OF A CONSTANT MIXTURE OF GAS AND AIR.
APPLICATION FILED MAR. 12, 1907.
937,016.
Patented Oct. 12, 1909.
3 SHEETS—SHEET 3.
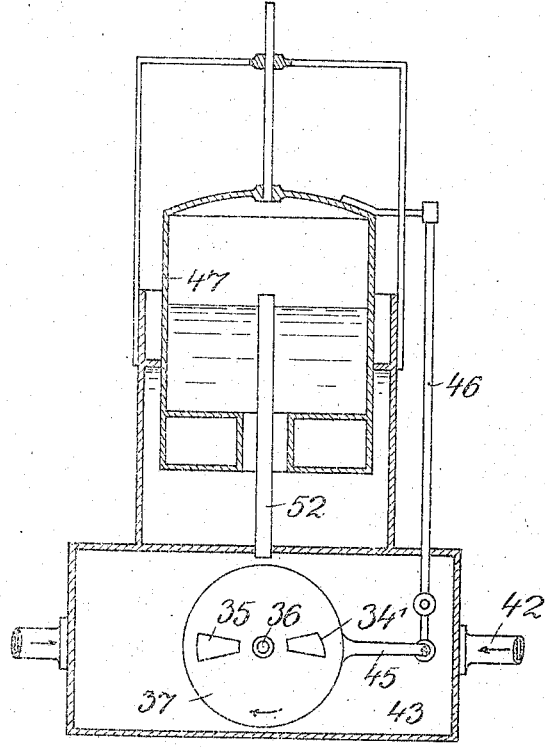
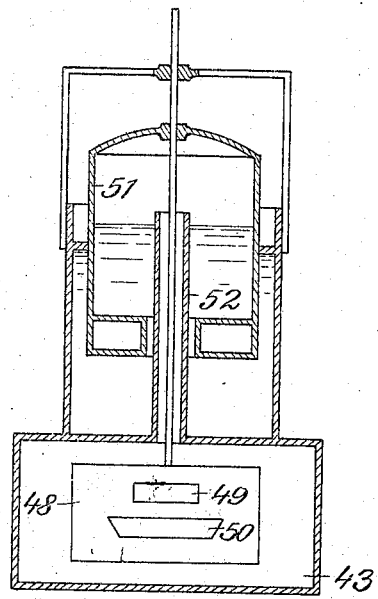
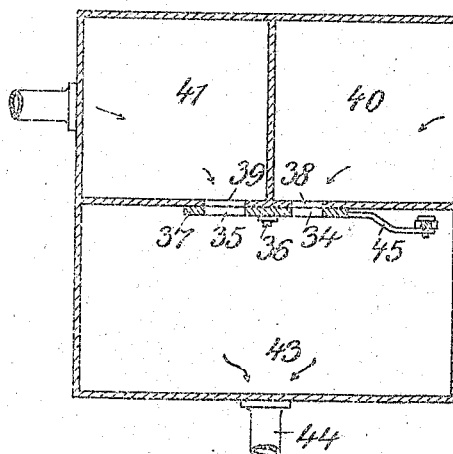
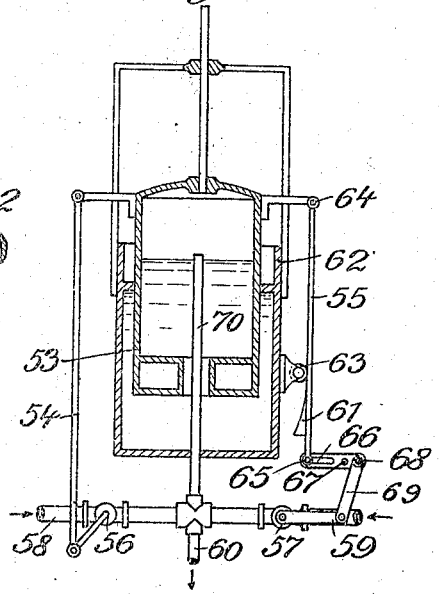
WITNESSES:
W. M. Avery
Walter Harrison
INVENTOR
Friedrich Wilhelm Wolff
BY Munn & Co
ATTORNEYS

UNITED STATES PATENT OFFICE.

FRIEDRICH WILHELM WOLFF, OF BERLIN, GERMANY, ASSIGNOR TO THE FIRM OF SELAS GESELLSCHAFT MIT BESCHRÄNKTER HAFTUNG, OF BERLIN, GERMANY.

MECHANISM FOR THE PRODUCTION OF A CONSTANT MIXTURE OF GAS AND AIR.

937,016.

Specification of Letters Patent.

Patented Oct. 12, 1909.

Original application filed February 7, 1906, Serial No. 300,020. Divided and this application filed March 12, 1907. Serial No. 361,922.

*To all whom it may concern:*

Be it known that I, FRIEDRICH WILHELM WOLFF, a subject of the German Emperor, residing at 22 Melanchthonstrasse, Berlin, Germany, chief engineer, have invented certain new and useful Improvements Relating to Mechanism for the Production of a Constant Mixture of Gas and Air, of which the following is a specification, this being a division of the application for Letters Patent for a process for the manufacture of a mixture of gas and air for illuminating purposes filed by me on February 7, 1906, Serial No. 300,020.
The invention relates to mechanism for the production of a constant mixture of gas and air for illuminating purposes, with the employment of a suction and forcing apparatus, the action of which is regulated in dependence upon the consumption, and which produces and sucks the mixture at low pressure, and sends it at an increased pressure into the service pipe.

The object of the invention is a double control of the cross-sections of the gas and air inlets for the purpose of equalizing on the one hand the difference of pressure between the suction pipe for the mixture and the supply pipe for the gas, and on the other hand the difference of pressure between the suction pipe for the mixture and the air supply pipe. In order to obtain this object, the inlets for the gas and air are enlarged and reduced under the influence of a governor in correspondence with the increase and decrease of the quantities of gas and air mixture consumed. This control of the cross-sections of the inlets is proportional to the consumption of the mixture. The second adjustment of the cross-section takes place in positive dependence upon the first proportional adjustment in such a manner, that some or all of the cross-sections experience an additional adjustment, so that for every separate setting effected by the first proportional adjustment errors are compensated for. These errors have their origin in the sources of error in the governor, for example, with float bells in the variation of the depth of immersion, with membrane governors in the differences of tension which arise in the membrane, and so forth, further in the fact, that the coefficient of resistance for gases of different specific weights, such
as illuminating gas and air are, does not
alter proportionately with the enlargement
or restriction of the apertures of different
magnitude. Accordingly, the smaller admission cross-sections are, the more speedily
and higher does the resistance curve exceed
the proportional amount. These causes of
undesirable variations of the mixture are
compensated for by the second adjustment
of the cross-section of the inlets.

Several examples for carrying the process into practice are illustrated in the accompanying drawing.

Figure 2:
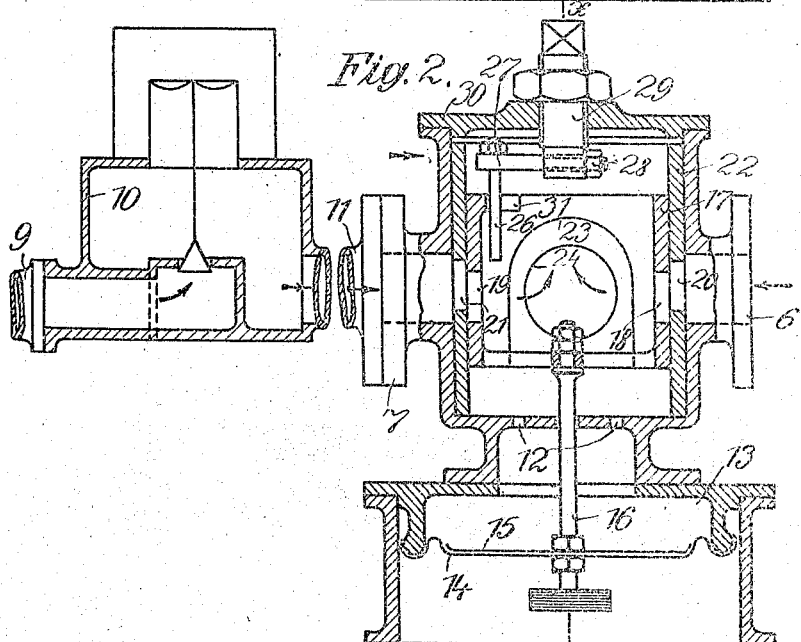

Figures 1 to 3 illustrate an apparatus with
rotary forwarding device, and adjustable
cylindrical obturating member; Figs. 1 and 2 show the governor in two vertical sections
in two planes perpendicular to each other,
while Fig. 3 is a horizontal cross-section.
Fig. 4 represents another constructional form
with adjustable obturating member. Figs. 5 and 6 illustrate in side elevation and horizontal section respectively an apparatus, the
obturating member of which has curved
closing edges. Fig. 7 shows a similar constructional form with inclined closing edges
on the obturating member. Fig. 8 shows an
apparatus with separate obturating members
for gas and air.

In the apparatus for carrying the invention into practice which is illustrated in Figs. 1 to 3, the suction and forcing device
(for example a continuously rotating device
1) which may be driven by means of a belt
2, sucks the mixture of gas and air from the
suction conduit 5 and the suction chamber 4 connected with it, and forwards it to the
service pipe 3 with which the burners or the
like are connected. The casing 4 of the suction chamber, which is here cylindrical, is
provided with the sockets 6, 7 and 8, Fig. 3.
Through the socket 6 the air enters the suction and mixing chamber 4 while the gas
enters through the socket 7 from the conduit
9, as shown in Fig. 2, by means of a pressure
regulator 10 of any known construction, and
of the gas supply pipe 11. The mixture of
gas and air formed under the influence of
the suction effect of the suction and forcing
apparatus 1 passes out of the suction chamber 4 into the mixture suction conduit 5 through the socket 8, Fig. 3. The suction chamber is in communication with the chamber 13 by means of openings 12 formed in the bottom of the casing 4.

The governor consists, in the present constructional form, of a membrane 14, which, by means of a plate 15 and the rod 16, carries the obturating member 17 common to the gas and air inlets. The rod 16 is rotatably fixed to the part 14, 15. The obturating member 17 is formed as a hollow piston, the walls of which are provided with the openings 18, 19 and 23, for the admission of air and gas, and the discharge of the mixture respectively (Fig. 3). The obturating member, for the purpose of facilitating the manufacture in this form of apparatus, does not move directly in front of the admission and discharge sockets of the suction casing 4, but in this latter a second cylindrical body 22 is arranged with openings 20, 21, 24, situated in front of the openings of these sockets, and coöperating with the openings 18, 19 and 23, of the obturating member. The openings 18, 19, are arranged relatively to each other in such a manner that on rotating the obturating member one of the admission openings 18, 19, is smaller than the other. The discharge aperture for the mixture 23, is however of such a size that when the obturating member is rotated no restriction of the discharge cross-section 23, 24, takes place.

As soon as the pressure in the service pipe 3 rises or falls beyond a certain limit, the supply furnished by the suction and forcing apparatus 1 alters. This supply influences the governor 14 acting upon the obturating member 17, which governor is raised or lowered according as the admission apertures for air and gas are to be enlarged or restricted. This adjustment of the obturating member, which is exclusively proportionate to the quantities supplied, is not however sufficient to obtain a completely constant mixing ratio for gas and air when the consumption varies. As already stated in the introduction to this specification, with an exclusively proportionate enlargement or restriction of the admission cross-sections, the resistances for gas and air do not alter correspondingly proportionally, but, on the contrary increase or decrease unproportionately by a constant amount. In the construction illustrated in Figs. 1 to 3, the second adjusting means for compensating for these special resistances consist of an inclined guide by means of which the obturating member 17 experiences a rotation during its axial movement. The inclined guide, which is independent of the governor 14, is constituted by a bolt 26, which by means of a supporting part 27, and of the fixing nut 28 may be set in any desired inclined position on the screw part 29. This latter may likewise be adjusted higher or lower on the cover 30 of the suction chamber casing 4.

The obturating member 17 is guided on the inclined bolt 26 by means of the projections 31.

By means of the second regulating device 26, the following result is obtained. As soon as owing to increased consumption, a more vigorous flow of gas and air takes place, and the obturating member 17 rises under the influence of the governor 14, the inclined guide 26, 31 causes the body 17 to effect a rotation around its axis in addition to its axial movement, thereby compensating the difference which would follow with an alteration of the cross-section produced exclusively by the governor 14 owing to the unproportional variations of resistance. The alteration of the cross-section occurring in the vertical direction corresponds exclusively to the proportional adaptation to the consumption of the gas and air mixture. The rotation of the obturating member, on the other hand, with an increasing consumption produces a restriction of the air inlet in the transverse direction, and a smaller restriction, maintaining constant or an enlargement of the gas admission cross-section transversely, according to the height of the obturating member. On the other hand, with an excess pressure in the service pipe there is an increase of the transverse dimension for the air inlet as compared with the transverse dimension of the gas inlet. The magnitude of the alteration of the transverse dimensions of the inlets is dependent upon the calculated or empirically determined magnitude of the increase of the resistances in the inlets.

In the construction illustrated in Fig. 4 a separate adjustment of the cylindrical obturating member 17 likewise takes place. The second adjusting means here consists of a screw threaded spindle 32 on which the obturating member moves up and down with its screw threaded sleeve 33, when the governor 14 becomes operative under the influence of the quantities supplied. Otherwise the operation and the separate adjustment of the gas and air inlets is the same as in the constructional form previously described.

The apparatus shown in Figs. 5 and 6 differs from that already explained by the different arrangement and formation of the obturating member. This latter is formed as a slide valve 37 rotatable around a pin 36, and carries the gas admission aperture 34 and the air admission aperture 35. The gas inlet 34 coöperates with the opening 38 in the gas chamber 40, and the air opening 35 coöperates with the outlet 39 in the air chamber 41. The gas is conducted to the chamber 40 through the conduit 42. The mixture is formed in the chamber 43, which is connected by means of a suction pipe 44 with a suction and forcing device of an appropriate kind. The suction and mixing chamber 43 communicates by means of a pipe 52 with the interior of a float bell 47. This latter engages with a lever arm 45 on the rotary slide valve 37 by means of a rod 46.

The operation is as follows: If the consumption of the gas and air mixture is constant, the suction process is also constant, and a constant suction pressure is formed in the chambers 43, 47 and to this a definite position of the float bell corresponds. When the consumption decreases, if no regulation were provided, the pressure in the suction pipe 44 would increase because the flow to the suction chambers of the forcing apparatus would take place with a smaller velocity corresponding to the decrease of velocity of the flow through the suction pipes toward the suction chamber of the suction apparatus. The increase of pressure in the suction chambers is however prevented owing to the fact that the float bell 47 rises and causes a reduction of the cross section for the admission of gas and air. Owing to this throttling of the intake of air and gas the resistance opposed to the suction process is increased to such an extent that the normal pressure usually prevailing is reëstablished. When, on the other hand, the supply furnished by the suction apparatus again increases so that a lower suction pressure exists in the suction pipe 44 and in the chambers 43, 47, the float bell must again descend, by which means the admission cross sections for air and gas are enlarged.

Now, in order to compensate for the prejudicial influence of the variations of the resistance for gas and air which was referred to in the introduction to this specification, in the construction illustrated in Fig. 5, one of the two inlet apertures 34, 35, is modified relatively to the openings 38 or 39 in a given manner, for example, by providing the gas admission aperture 34 with a curved closing edge 34'. As shown in Fig. 5 in this constructional form the opening 35 for the supply of air is limited by two radial lines, and by two arcs of circles with the pivot 36 as center. The gas admission opening 34 is formed in a similar manner, except that the outer circular arc is replaced by an eccentric curve 34'. Assuming also that the openings 38 and 39 situated behind the slide valve have the same cross section, it will be obvious that with a rotation of the slide valve in the direction indicated by the arrow, the opening 35 will be obturated proportionately to the angle of rotation, while the opening 34 will be obturated by an accelerated amount owing to the decrease of the radii toward the closing direction. In this case, therefore, the compensation for the variations of resistance is obtained by the predetermined modification of the width of one opening. The regulation which is here obtained by the varying formation of the one opening could of course be transferred to the two openings by appropriate modifications. The exact form of the curves to be employed must be adapted either empirically or by calculation to the conditions of each apparatus.

According to the quality of the gases which are to be sucked and mixed, it is necessary to effect an acceleration or a retardation of the closing movement by the second adjustment as compared with the first proportional adjustment. The forms of the admission apertures by means of which these adjustments may be obtained may of course vary largely and may be transferred to one or more obturating edges.

In the constructional form illustrated in Fig. 7, instead of a rotary slide valve, an obturating slide 48 displaceable in an axial direction and connected with a float bell 51 is provided; this valve likewise carries both the admission apertures 49, 50 for gas and air. The separate adjustment of the admission cross sections is obtained in this case analogously to that in Fig. 5, owing to the fact that the closing edges of one or both admission apertures are chamfered. As shown in the drawing, in the example here selected this admission aperture 50 is made of rhomboidal form. Otherwise the operation is the same as in the apparatus illustrated in Fig. 5.

In accordance with Fig. 8, a float bell 53 acts by means of the rods 54, 55, on two special obturating members for the gas and air admission which are formed as cocks 56, 57. The cock 56 is arranged in the gas pipe 58 and the cock 57 in the air pipe 59. In this case the pressure in the suction conduit 60 is transmitted to the interior of the float bell 53 through a subsidiary conduit 70. In the case of excess pressure in the service pipe, the float bell 53 rises, and in doing so restricts the cross-section for the passage of gas and air by means of the cocks 56 and 57 until the constant suction pressure is reëstablished. On the other hand, when the consumption increases the cross section of the passage is enlarged. In order to eliminate the special variations of resistance for gas and air which have already been referred to a number of times, one or both obturating members are provided with special means for separate adjustment of the cross section of the passage, which means may be fixed or adjustable. This separate regulation of the cross section of the passages is rendered dependent upon a variation of the closing velocity of the cocks 56, 57, in the example illustrated in Fig. 8. To this end an inclined or cam-like face 61 is provided on the rod 55 and upon the ascent and descent of the float bell 53 runs on a roller 63 affixed to the liquid reservoir 62. By this means the rod 55 is rotated around its point of suspension 64. On the lower end the rod 55 is guided by means of a stud 65 in the slot 66 of the two armed lever 68 rockably suspended at 64, and which with its other end acts upon the cock 57 by means of the rod 69. By means of this arrangement the result is attained that the alteration of the cross section of the passage at 57 does not take place uniformly exclusively under the influence of the governor acted upon by the consumption, but with acceleration, whereby differences in the resistances are avoided.

In the example represented, only the one rod 55 coöperates with the one obturating member 57. Obviously, the rod 54 might exert a similar action. The cam surface 61 may be fixed to its supporting rod in such a manner that its inclination may be adjusted, and further, instead of an accelerated alteration of the cross-section, it may cause a retarded alteration just as required by the prevailing conditions.

From what has been stated, it will be apparent that the novel process may be carried into practice in numerous ways. It is essential that in all cases, the cross-section of the gas and air inlets should be altered in a double sense, for the purpose of maintaining constant the difference of pressure between the suction conduit on the one hand, and the supply conduit for gas and air on the other hand, whereby the means for automatically varying the cross-sections of the admission apertures, the so called admission governor, may be displaced by means of the pressure or by the suction conduit or in any other known manner.

From the above description it will be noted that by variations of pressure in the contained volume of the mixture, a direct control is exercised over the inflow of the gas and air, and also that by further variations of pressure of said explosive mixture an indirect or remote control is also exercised over the inflow, the net result being that beyond certain pressures in the contained volume of the aeriform body the opening of the passages is disproportionate to what would take place if the control over the inflow were of a simple character.

What I claim and desire to secure by Letters Patent of the United States is:

1. An apparatus for the production of a constant mixture of gas and air, comprising a suction device, a mixing chamber connected therewith and provided with inlets for gas and air so as to form a mixture thereof, and means for varying disproportionately the areas of said inlets, said means being controllable directly by alterations in the pressure of said mixture.

2. The combination of a suction device, a mixing chamber connected therewith and provided with inlets for gas and air so as to form a mixture thereof, means movable by alterations of pressure of said mixture for varying the size of said inlets, and mechanism controllable directly by said means for qualifying the action of said means so as to render the size of said inlets disproportionate relatively to each other.

3. The combination of a suction device, a suction pipe connected therewith, a hollow member connected with said suction pipe and adapted for holding a mixture of gas and air, said hollow member being provided with an opening for admitting gas and another opening for admitting air, an obturating member mounted within said hollow member and provided with openings adapted to register more or less imperfectly with those of said hollow member, means controllable directly by the pressure of said mixture for moving said obturating member relatively to said hollow member so as to enlarge or restrict proportionately the supply of gas and the supply of air flowing into said hollow member, and means becoming operative by the motion of said above means for regulating the movements of said obturating member so as to vary the registry of the openings in said obturating member relatively to the openings in said hollow member.

4. The combination of a suction device, a suction pipe connected therewith, a mixing chamber connected with said suction pipe and provided with inlets for admitting gas and air so as to form a mixture therein, means controllable by pressure of said mixture for varying proportionately the sizes of said inlets, means becoming operative by the motion of the first mentioned means for affecting said first-mentioned means so as to render disproportionate the variation in the sizes of said inlets, and adjusting mechanism for varying the effect of said last-mentioned means.

5. The combination of a suction device, a suction pipe leading thereto, a mixing chamber connected with said suction pipe and provided with inlets for gas and air so as to form a mixture thereof, an obturating member for varying the sizes of said inlets, means controllable by pressure for actuating said obturating member, means becoming operative by the motion of said above means for qualifying the movement of said obturating member relatively to said mixing chamber for the purpose of rendering disproportionate the relative capacity of the inlets for gas and air, and mechanism adjustable by hand for adjusting the movement of said obturating member.

In witness whereof I have hereunto set my hand in the presence of two witnesses.

FRIEDRICH WILHELM WOLFF.

Witnesses:
HENRY HASPER,
WOLDEMAR HAUPT.